United States Patent [19]
Borrelli et al.

[11] Patent Number: 5,375,012
[45] Date of Patent: Dec. 20, 1994

[54] BIREFRINGENT GLASS WAVEPLATE

[75] Inventors: Nicholas F. Borrelli; Thomas P. Seward, III, both of Elmira, N.Y.

[73] Assignee: Corning Incorporated, Corning, N.Y.

[21] Appl. No.: 959,988

[22] Filed: Oct. 13, 1992

Related U.S. Application Data

[63] Continuation-in-part of Ser. No. 714,622, Jun. 13, 1991, abandoned.

[51] Int. Cl.$^5$ ............................................. G02B 5/30
[52] U.S. Cl. .................................. 359/485; 359/494; 359/495
[58] Field of Search ............... 359/483, 485, 488, 490, 359/492, 494, 495, 497

[56] References Cited

U.S. PATENT DOCUMENTS

| | | | |
|---|---|---|---|
| 2,123,901 | 7/1938 | Land | 88/65 |
| 2,158,130 | 5/1939 | Land | 88/65 |
| 2,347,582 | 4/1944 | Ulffers | 88/65 |
| 3,350,982 | 11/1967 | Marks | 88/24 |
| 3,438,691 | 4/1969 | Makas | 350/157 |
| 3,870,399 | 3/1975 | Randall et al. | 350/96 B |
| 3,927,930 | 12/1975 | Goldberg et al. | 350/151 |
| 3,942,871 | 3/1976 | Saeva | 350/150 |
| 4,304,584 | 12/1981 | Borrelli et al. | 65/30.11 |
| 4,479,819 | 10/1984 | Borrelli et al. | 65/30.11 |
| 4,981,342 | 1/1991 | Fiala | 359/494 |
| 5,002,370 | 3/1991 | Okura et al. | 350/375 |

FOREIGN PATENT DOCUMENTS

| | | |
|---|---|---|
| 2370303 | 6/1978 | France . |
| 3504558 | 8/1986 | Germany . |
| 3642897 | 6/1988 | Germany . |
| 59-64802 | 12/1984 | Japan . |

OTHER PUBLICATIONS

Publication by P. D. Hale and G. W. Day, "Stability of Birefringent Linear Retarders (Waveplates)", Applied Optics, 27(24), 5146–53(1988).
Publication by Takamori and Tomozawa in vol. 59, No. 9–10, pp. 377–379, Journal of the American Ceramic Society, entitled "Birefringence and Microstructure of Anisotropic Borosilicate Glasses".
Applied Optics, vol. 21, No. 24, Dec., 1982, New York US, pp. 4526–4532; S. D. Jacobs et al.: "Optical glass wave plates" (p. 4527; FIGS. 1, 2).
Journal of the American Ceramic Society, vol. 59, No. 9–10, Sep. 1976, Columbus US, pp. 377–379; T. Takamori et al.: "Birefringence and Microstructure of Anisotropic Borosilicate Glasses", (p. 377, FIG. 3).

*Primary Examiner*—Ricky D. Shafer
*Attorney, Agent, or Firm*—Milton M. Peterson; Clinton S. Janes, Jr.

[57] ABSTRACT

A birefringent waveplate is composed of an integral, transparent, glass body having a thermally developed dispersed phase therein composed of particles having a high aspect ratio and being oriented and aligned in one direction, whereby the glass body is rendered birefringent so that polarized components of light transmitted through the glass body have a phase shift introduced.

11 Claims, 2 Drawing Sheets

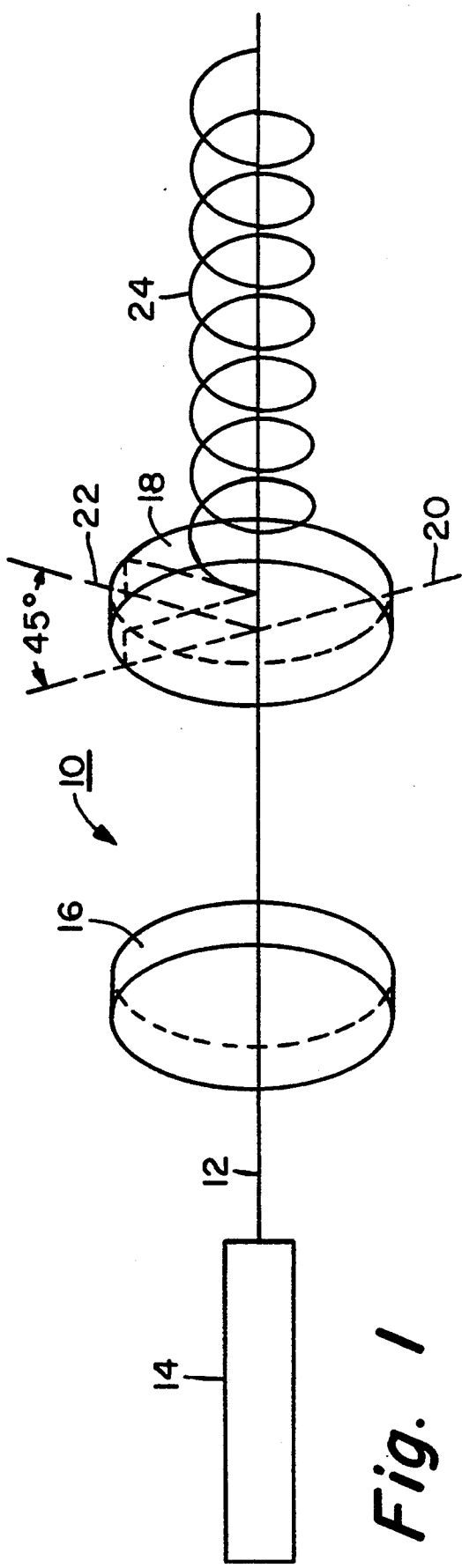
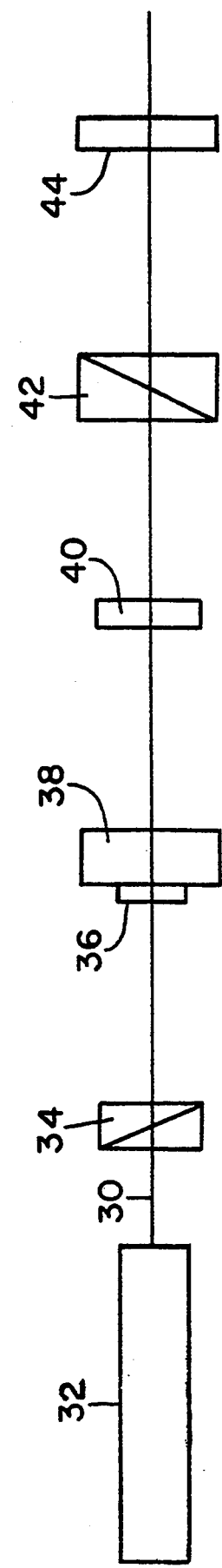

BIREFRINGENT GLASS WAVEPLATE

This application is a continuation-in-part application of Ser. No. 07/714,622, filed Jun. 13, 1991, and now abandoned.

FIELD OF THE INVENTION

The field is birefringent waveplates and optical systems embodying such waveplates.

BACKGROUND OF THE INVENTION

A waveplate is also referred to as a linear phase retarder, or as a retarder plate. A waveplate introduces a phase shift between polarized components of light transmitted through the plate. It functions in an optical system to modify and control the relative phase of each constituent beam.

A waveplate is a body of birefringent material in which the ordinary ray and the extraordinary ray travel at different velocities. Consequently, one ray is retarded relative to the other. The path difference $k\lambda$, in wavelengths, between the two rays is given by $$k\lambda = \pm l (n_e - n_o) \text{ where}$$

$n_e$ = refractive index of the extraordinary ray,
$n_o$ = refractive index of the ordinary ray,
$l$ = physical thickness of the plate, and
$\lambda$ = wavelength of the light ray.

"k" can be considered the retardation expressed in fractions of a wavelength. The phase difference between two rays traveling through a birefringent material is $2\pi/\lambda$ times the path difference. Therefore, the phase difference, called the plate retardation $\delta$, may be expressed as, $$\delta = \pm \frac{2\pi l(n_e - n_o)}{\lambda}$$

Thus, if a phase difference $$\frac{\pi}{2}$$

is introduced between the ordinary and extraordinary rays, the plate is termed a quarter-wave plate. The same characterization is true for any condition expressed by $(2\pi)m + \delta$ when "m" is an integer. When "m" is zero, the term zero-order waveplate is used; when "m" is other than zero, the plate is termed a multiple order waveplate.

The simplest retardation plate is a slice cut out of a uniaxial crystal, the slice being cut so that the optic axis lies in a plane parallel to the face of the plate. Heretofore, the principal materials used in waveplate production were crystalline materials such as quartz, calcite and mica. These crystalline materials are well recognized as being highly birefringent. Because of their large birefringent values, the thickness of a zeroth order waveplate would necessarily be impractically thin. For example, the thickness of such a plate would be on the order of 25 microns. Therefore, a practical waveplate, produced from such crystalline materials, must be of a higher order, that is, a multiple of $2\pi$ plus the phase difference.

A recent publication by P. D. Hale and G. W. Day, "Stability of Birefringent Linear Retarders (Waveplates)", Applied Optics, 27(24), 5146-53(1988), discusses various types of waveplates and their features. In particular, the publication discusses how retardance in the various types varies with temperature, angle of light ray incidence and wavelength. For example, the effect of a slight deviation in angle of incidence is magnified by the multiple order of retardation inherent in an integral, crystalline waveplate. The term "integral" indicates a unitary, crystalline waveplate composed of a single material.

The authors conclude that, for a waveplate application requiring high stability, a low order, and ideally zero order, waveplate should be chosen. Since a zero-order, integral plate is impractically thin, it is common practice to resort to compound waveplates. Thus, to obtain a 30° retardation (quarter-wave), a positive plate of 360°+30° is sealed to a negative plate of 360°. This provides the desired 30° retardation required with the multiple orders cancelling out.

The authors of the publication discuss problems encountered with prior compound waveplates, and propose a novel, four unit, compound plate. All such compound plates suffer from the fact that they are time-consuming, and hence expensive, to produce. Also, inherently, a crystalline waveplate must be flat, as determined by the rigid, three-dimensional, crystal lattice. For some applications, however, a waveplate in the form of a compound curvature may be advantageous.

It has also been proposed to produce waveplates from organic plastic materials, and such products are commercially available. Such materials are limited to low temperature applications, of course. They also are susceptible to instability from atmospheric moisture, and must be protected from dust in the environment since they are soft and easily scratched in cleaning.

PURPOSES OF THE INVENTION

A basic purpose is to provide a durable, environmentally stable, birefringent waveplate.

Another purpose is to provide a zero order, integral waveplate having a practical thickness for finishing and handling.

A further purpose is to provide such a waveplate that is relatively inexpensive and easy to produce.

A still further purpose is to provide improved optical polarizing systems embodying such waveplates.

A further purpose is to provide a waveplate that can be reshaped to a curved surface.

SUMMARY OF THE INVENTION

Our invention resides in a birefringent waveplate that is composed of an integral, transparent, glass body having a thermally developed dispersed phase in the glass body, the thermally developed phase being composed of amorphous or crystalline particles having a high aspect ratio, the particles being oriented and aligned along a common axis, whereby the glass body is rendered birefringent so that polarized components of light transmitted through the glass have a phase shift introduced. The glass may be one containing elongated silver halide particles having a large refractive index ratio to that of the matrix glass. Alternatively, it may be a phase-separated glass, one phase being of high refractive index, such as a lead borate, or a borosilicate, having a borate-rich, second phase.

In one embodiment, the waveplate is associated with a polarizing member to provide a circular polarizer. In another embodiment, the waveplate is reshaped to have a spherical curvature.

PRIOR ART

In addition to the art already noted, attention is directed to the following United States Patents:

U.S. Pat. No. 4,304,584 (Borrelli et al.) describes glasses exhibiting polarizing properties and containing silver halide particles. The polarizing properties are imparted by elongating the glass under stress by drawing, extruding, rolling, or stretching at temperatures between the annealing point and softening point of the glass. This is followed by heat treating in a reducing atmosphere to reduce silver ions to metallic silver. The article produced is a polarizer that polarizes visible light through anisotropic absorption. This is to be distinguished from a wave plate which is optically transparent and its anistropy introduces a phase shift between polarized components of light.

U.S. Pat. No. 4,479,819 (Borrelli et al.) describes preparation of infrared polarizing glasses from glasses containing silver halide particles. The method involves heat treating a glass containing silver and a halide to generate silver halide particles, elongating the glass under stress to impart an aspect ratio of at least 5:1 to the particles, and then exposing the glass to a reducing environment to reduce the silver halide to metallic silver. In like manner to U.S. Pat. No. 4,304,584, supra, the article produced is a polarizer for polarizing light. It is not a transparent wave plate that introduces a phase shift between polarized components of light without absorption.

U.S. Pat. No. 2,158,130 (Land) discloses a combination of two units, rather than an integral body. Both units are fabricated from plastic materials, not glass. The particles in the Land plastic sheets do not result from phase separation; rather, they are foreign particles dispersed in the plastic. The particles in one unit are oriented perpendicularly to those in the other unit in order to create a polarizing effect. In short, the combination is a light polarizer, not a wave plate.

U.S. Pat. No. 3,870,399 (Randall et al.) describes a pseudo-fiber optic device produced by stretching a bar of phase-separated glass to elongate the second phase droplets. This creates light transmitting channels through the continuous primary glass phase. Phase-separable glasses shown are lead borates and lead, calcium, barium, or strontium silicates or borosilicates. The articles described in the patent function as a fiber optic or a waveguide device. They would not function as a wave plate to phase shift polarized light.

A publication by Takamori and Tomozawa in Vol. 59, No. 9-10, pp. 377-379, Journal of the American Ceramic Society, is entitled "Birefringence and Microstructure of Anisotropic Borosilicate Glasses". The article describes optically anisotropic glasses obtained by the uniaxial stretching of phase-separated borosilicate glasses. The positive birefringence is attributed to form birefringence, and the negative birefringence to anisotropic distribution of the separated phase.

BRIEF DESCRIPTION OF THE DRAWING

FIG. 1 is a schematic, perspective view of a circular polarizer in accordance with the invention, FIG. 2 is a schematic illustration of a standard testing system employed in measuring phase shift.

DESCRIPTION OF THE INVENTION

Figure 3:
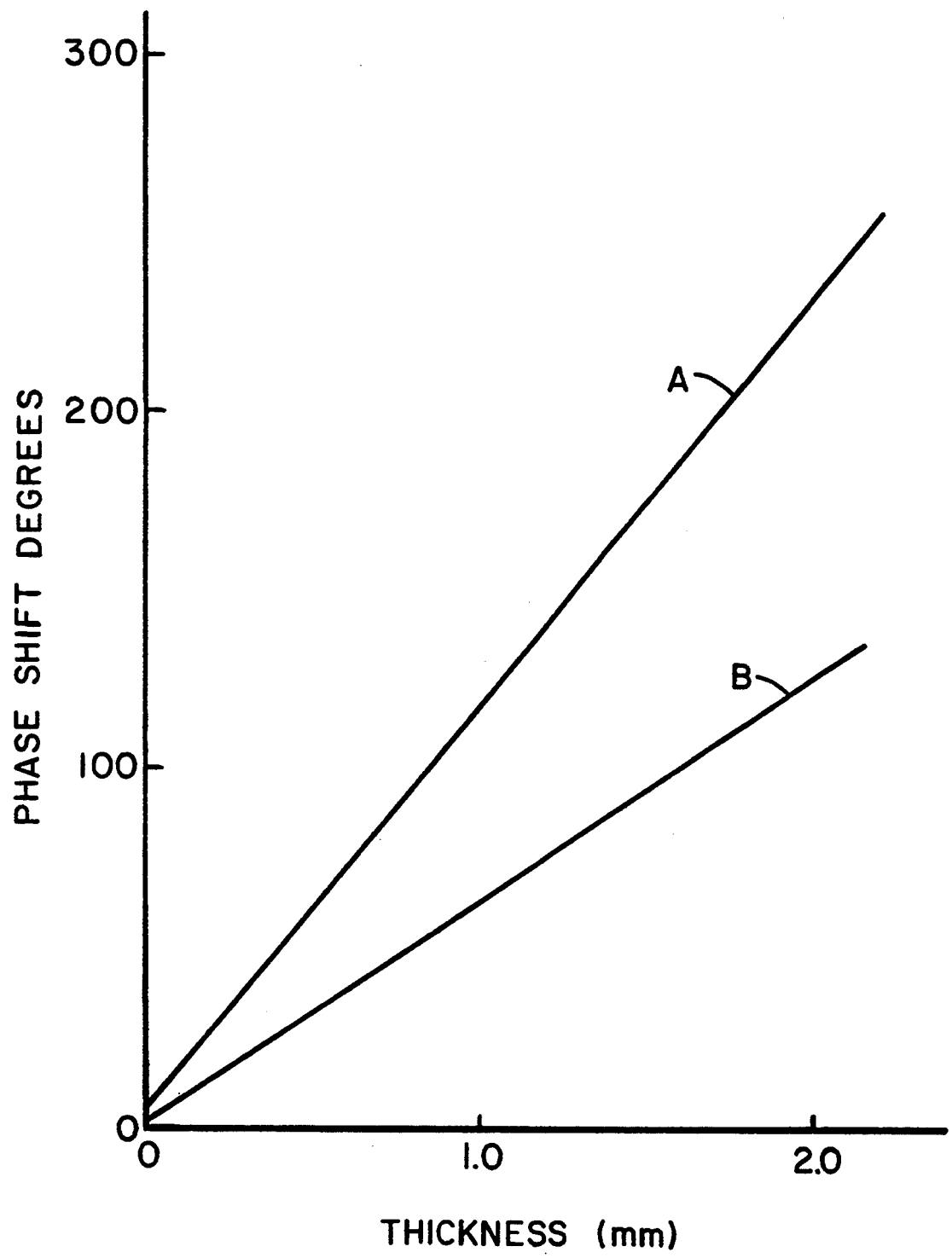
FIG. 3 is a graphical representation of data obtained employing the testing system of FIG. 2.

It has been observed, in the PRIOR ART section, that the Borrelli et al. '584 and '819 patents relate to the production of polarizing glasses from glasses containing silver halide particles. The glasses may or may not be photochromic. The polarizing treatment is a two-step process. In general terms, the process may be described as (a) subjecting the glass to stress while at an elevated temperature to elongate and align the silver halide particles in the direction of the stress, and (b) heat treating the stretched glass in a reducing atmosphere. The second step reduces a portion of the silver ions to metallic silver which is deposited in or upon the elongated particles.

We have now found that the stretched glass exhibits a high degree of birefringence when it is in the intermediate stage of the polarizing process. In this stage, the glass contains elongated, silver halide particles, but no reduced or metallic silver.

We term the birefringent mechanism "form birefringence". The anisotropic behavior stems from the asymmetric depolarization fields of the elongated particle. That is, the dipole moment, $\mu$, is proportional to the local field, through the polarizability, $\alpha$, $$\mu = \alpha E_{loc}$$

and the local field is made up of the external field and the depolarization field, which is taken to be proportional to the polarization, P, $$E_{loc} = E_0 + 4\pi LP$$

The depolarization factor, L, is a function of the shape, or form, of the imbedded particle. The values of L are defined for the convenient symmetry directions of the particle. The sum of the three values of L must equal unity. For a sphere, $L_a = L_b = L_c = \frac{1}{3}$; for a long cylinder, $L_c = 0$, $L_a = L_b = \frac{1}{2}$, where the c direction is taken along the axial direction of the cylinder. The form birefringent property derives from the anisotropic nature of the polarizability. Eliminating $E_0$ between the previous two equations yields the expression for the polarizability. This, in turn, can be expressed as refractive index difference $\Delta n$, as follows, for the two polarizing directions in the material, $$\Delta n = (V_f/2n_0)(N^2-1)\{1/[L_1)N^2-1)+1] - 1/[L_2(N^2-1)+1]\}$$

In this equation, $V_f$ is the volume fraction of the separated phase, $n_0$ is the average refractive index of the glass, N is the ratio of the refractive index of the separated phase to the surrounding phase, and $L_1$ and $L_2$ are the respective depolarization factors for the 1 and 2 directions of the embedded particles. One should note that the larger the value of N is, the larger the resulting n for the same aspect ratio of the particle.

The birefringent characteristics of a glass containing elongated, silver halide particles, taken with the inherent thermal and environmental stability of such a glass, renders it particularly useful for waveplate purposes. Thus, the degree of birefringence permits producing a zero order waveplate in an integral body having a practical thickness because the value of N is of the order of 2.1/1.5 = 1.4. In addition, the magnitude of the birefringence permits producing a zero order waveplate in an integral body having a practical thickness. With wavelengths in the visible range, plate thicknesses of 0.5 to 1.5 mm are possible. Somewhat greater thicknesses may be required in the infra-red range, but are still practical.

For waveplate purposes, a glass containing silver halide particles is subjected to only the initial step of the polarizing process, that is the step of elongating the particles under stress. Glass composition families and elongation conditions are described in considerable detail in the prior '584 and '819 patents. Both the composition and treatment conditions are equally applicable for present purposes. Accordingly, the disclosures of the patents are incorporated by reference herein in their entirety.

In general, any glass containing silver halide particles, whether photochromic or simply phase separated, may be employed. Also, stress may be applied by any known means at a temperature generally in the range between the annealing temperature and the softening point of the glass. There are, however, other significant factors that must be considered in producing an acceptable waveplate.

One of these factors is the amount of light scattering that can be tolerated. Light scattering is related to the size and aspect ratio of the particle involved. It has been observed that the aspect ratio of the silver halide particle is reduced to about a third of its initial value during the chemical reduction to induce polarization. Therefore, the particle size of the silver halide produced during an initial glass heat treatment need not be as great for waveplates as for polarizing glasses, and may be balanced against the degree of light scattering permitted.

The ideal waveplate particle would have a high aspect ratio, preferably greater than 5:1. At the same time, it should be of minimal size in both dimensions to minimize light scattering.

In the case of photochromic glasses, the photochromic behavior might need to be eliminated, and/or attention paid to device design so that a closed optical system, or a suitable UV blocking filter, is employed. Otherwise, ambient UV radiation would tend to activate the silver halide and darken the glass. However, in many cases, the wavelength of use of the waveplate is beyond the wavelength of the photochromic absorption band, so it is of no consequence. No appreciable absorption is observed beyond 800 nm.

We have further found that phase-separated glasses other than the silver halide type glasses may be employed for waveplate purposes. Various other types of phase-separated glasses are available. These include $PbO-B_2O_3$ glasses, and borosilicate glasses with high $B_2O_3$ contents, that tend to exhibit a secondary borate phase, particularly if heat treated. Also contemplated are phase-separable, bivalent metal (lead, calcium, barium and strontium) oxide, silicate and borosilicate glasses such as disclosed in the earlier-mentioned, Randall et al. patent. As mentioned above, the larger the ratio of the refractive indices between the two phases, the larger the birefringence for the same particle shape.

The expression "phase-separated glass" is employed here in its conventional sense as understood in the glass art. That is, a phase-separated glass is defined as a glass which, upon heat treatment, separates into at least two phases; one phase being in the form of particles, either amorphous or crystalline, dispersed in a matrix of a second phase. In the present inventive glasses the separated particles are sufficiently small in diameter such that the glass is transparent to visible light. Furthermore, the separated particles exhibit a refractive index sufficiently different from that of the matrix glass and are elongated such that the glass article is rendered birefringent, whereby polarized components of light transmitted through the article have a phase shift introduced.

The particles in phase-separated borate and borosilicate glasses tend to be easier to stretch than the particles in glasses containing silver halide. However, a greater degree of birefringence is achieved in stretching the silver halide particles to the same extent. This is because the refractive index of the separated, silver halide particles, relative to their matrix glass, is greater than the corresponding relationship in the case of a borate glass phase. Therefore, the choice of glass will depend in large measure on the degree of birefringence required, or desired, in a given application.

The glass employed will transmit light at wavelengths within the visible and infra-red portions of the spectrum, in particular at wavelengths within the range of 400-2000 nanometers. It will have a second phase wherein the particles not only have a high aspect ratio, but also have a very different refractive index from that of the matrix.

It is a particular feature of a glass waveplate that a conventional flat plate may be reshaped to have a compound curvature, such as a spherical curvature. In reshaping, it is necessary to use sufficiently high forces, and low temperature or high speed, so that the glass can be deformed without the elongated particles returning to their original spherical shape.

The optical instrument art is fully cognizant of waveplate applications, and applications for quarter-wave plates in particular. One such application is in a device, known as a circular polarizer, that produces circularly polarized light. In this device, a quarter-wave plate is associated with a polarizer that provides an input of linearly polarized light. The plate is so positioned that the angle $\theta$ between the plane of the electric field of the incident, linearly polarized beam and the principal plane of the waveplate is 45 degrees.

FIG. 1 in the attached drawing is a schematic, perspective view of the components and operation of a circular polarizer 10. Thus, a beam of light 12, from a laser 14, for example, passes through a polarizer 16 where it is linearly polarized. The beam then proceeds to, and passes through, a waveplate 18. If the crystalline optic axis 20 of waveplate 18 is set at an angle of 45° to the input polarization plane 22, as shown, the emergent light is circularly polarized, that is, its electric field vector traces out a helical path 24 as it propagates.

One optical instrument utilizing such circular polarization is termed an optical isolator. In this operation, reflected light, that has originally passed through the plate, is extinguished or cancelled out. The reflected, circularly polarized light is converted back to linearly polarized light, but rotated 90° with respect to the original direction, as it returns through the waveplate. This 90° rotated, linearly polarized light is then extinguished as it passes into the initial polarizer. Isolators are used to prevent feedback from an instrument that may be deleterious to the generating of a light source, such as a laser, or its operation.

The invention is further described with reference to studies made in determining the magnitude of birefringence in two typical stretched glasses. One glass (A) was a silver halide-containing glass; the other (B) was a PbO—$B_2O_3$ glass. The glass compositions, in parts by weight (approximating percent by weight), were as follows:

|  | A | B |
| --- | --- | --- |
| $SiO_2$ | 56.3 | — |
| $B_2O_3$ | 18.2 | 58.8 |
| $Al_2O_3$ | 6.2 | 0.5 |
| PbO | — | 41.2 |
| $Na_2O$ | 5.5 | — |
| $Li_2O$ | 1.8 | — |
| $K_2O$ | 5.7 | — |
| $ZrO_2$ | 5.0 | — |
| $TiO_2$ | 2.3 | — |
| Ag | 0.20 | — |
| CuO | Trace | — |
| Cl | 0.14 | — |
| Br | 0.12 | — |

In one study, phase shift was measured on five samples of Glass A. Each sample had a different thickness, and each of the five samples was measured at two wavelengths, 633 and 1050 nanometers. Thus, one measurement was in the visible; the other in the near infra-red.

A standard testing procedure was employed, as illustrated schematically in FIG. 2. As there shown, a beam of light 30 is directed from a light source 32, such as a laser, through a polarizer 34 to a glass test piece 36 mounted on a divided circle 38. From the test piece 36, the polarized beam passes through a quarter-wave plate 40 to an analyzer 42 and detector 44.

The use of a quarter-wave plate, aligned with the incident polarization and oriented 45° from the optic axis of the sample, allows the phase shift to be measured by a null technique. The procedure was to set the polarizer 34 to 45° to the vertical, then rotate the analyzer 42 to null. The quarter-wave plate 40 was inserted into the beam and rotated until null. This insured that its optic axis was aligned with the polarization direction. The sample 36 was mounted on a divided circle 38 and placed in the beam and rotated to a null, then it was rotated 45°. The analyzer 42 was rotated to null. The amount of rotation from the initial null is equal to one-fourth of the phase shift. The results shown in Table I were obtained, where the relationship between the measured phase shift and the birefringence is given by $$\delta = (2\pi l/\lambda)\Delta n, \qquad 3)$$

where l is the thickness of the sample.

The data thus determined were plotted to obtain the graphical representation of FIG. 3. In that FIGURE, phase shift, in degrees, is plotted on the vertical axis, and sample thickness is plotted on the horizontal axis. Straight line A is based on measurements made with 633 nanometer wavelength light; line B with measurements using 1050 nanometer wavelength light.

Calculations show that the phase shift with the 633 nanometer light was 120 degrees/mm sample thickness, and n was $2.1 \times 10^{-4}$. Likewise, the phase shift with 1050 nanometer light was 64.3 degrees, and n was $1.9 \times 10^{-4}$.

Further tests were made on separate samples of Glass A. Each sample was elongated by applying a different degree of stress. This imparted different aspect ratios to the silver halide particles, and consequently a polarization maximum (Max. Polar.) at a different wavelength. The higher the wavelength of maximum polarization, the more elongated the silver halide particle, and the higher the expected value of $\Delta n$. The TABLE below shows the wavelength ($\lambda$) of maximum polarization in nanometers and the birefringence as calculated by the equation noted earlier.

TABLE

| Max. Polar. ($\lambda$ nm) | $\Delta n \times 10^{-4}$ |
| --- | --- |
| 590 | 1.63 |
| 750 | 2.13 |
| 1140 | 2.65 |
| 1640 | 2.89 |

A similar test was performed on samples of Glass B, also at two wavelengths, namely, 589 nm and 1050 nm. The calculated birefringence values were $2.4 \times 10^{-4}$ at 589 nm and $2.23 \times 10^{-4}$ at 1050 nm. A value of $2.5 \times 10^{-4}$ was calculated for a PbO—$B_2O_3$ glass of slightly different composition. These data indicate that phase-separated glasses, characterized by a lead borate second phase, are also satisfactory for present purposes. As indicated earlier, the stresses required to elongate droplets in a borate, phase-separated glass are generally lower than those required for silver halides in glass. However, the degree of birefringence achieved is also lower.

The data shown in Table 1 clearly shows that phase shifts of the order of half waves are obtainable in thicknesses of the order of millimeters. Using equation 3, one would require a thickness of 2.16 mm at a wavelength of 1050 nm to achieve halfwave performance for the stretched photochromic glass and 2.34 mm for the PbO—$B_2O_3$ phase-separated glass. The Takamori et al. publication, noted earlier, reported a value of $10^{-4}$ for a phase-separated borosilicate glass. Based on that value, a waveplate produced from the glass would require a thickness of about 5 mm.

In summary, it has been shown that either an elongated glass containing silver halide particles, or an elongated, phase-separated glass, may be used as a waveplate. The choice is between ease of stretching, yet lower birefringence, with the phase-separated glass, and the greater stress required to stretch the silver halide-containing glass with a resulting higher birefringence.

We claim:

1. A birefringent waveplate that is composed of an integral, transparent body of a phase-separated glass, the phase-separated glass consisting of amorphous or crystalline particles dispersed in a glassy matrix, the phase-separated glass being selected from the group consisting of lead borate glasses, bivalent metal oxide silicate glasses and alkali metal oxide aluminosilicate glasses from which silver halide crystals are separated, the dispersed amorphous or crystalline particles having a high aspect ratio and being oriented and aligned along a common axis, whereby the waveplate is rendered birefringent so that polarized components of light transmitted through the waveplate have a phase shift introduced.

2. A birefringent waveplate in accordance with claim 1 wherein the glass is a bivalent metal oxide, silicate glass, the bivalent metal being selected from the group composed of lead, calcium, barium and strontium.

3. A birefringent waveplate in accordance with claim 1 wherein the glass is a phase-separated lead borate glass.

4. A birefringent waveplate in accordance with claim 1 wherein the glass is an alkali metal oxide aluminosilicate glass that has a silver halide crystal phase.

5. A birefringent waveplate in accordance with claim 4 wherein the glass is non-photochromic.

6. A birefringent waveplate in accordance with claim 1 wherein the glass body is a thin sheet having a thickness in the range of 0.5 to 5.0 mm.

7. A birefringent waveplate in accordance with claim 6 wherein the glass thickness is in the range of 0.5 to 1.5

8. A birefringent waveplate in accordance with claim 1 wherein the waveplate has a zero order phase shift.

9. A birefringent waveplate in accordance with claim 1 wherein the geometry of the glass body is a compound curvature.

10. A birefringent waveplate in accordance with claim 9 wherein the curvature is spherical.

11. A circular polarizer comprising a polarizer element in conjunction with a birefringent waveplate that is composed of an integral, transparent body of a phase-separated glass, the phase-separated glass consisting of amorphous or crystalline particles dispersed in a glassy matrix, the phase-separated glass being selected from the group consisting of lead borate glasses, bivalent metal oxide silicate glasses and alkali metal oxide aluminosilicate glasses from which silver halide crystals are separated, the dispersed amorphous or crystalline particles having a high aspect ratio and being oriented and aligned along a common axis, whereby the waveplate is rendered birefringent so that polarized components of light transmitted through the waveplate have a phase shift introduced.

* * * * *